United States Patent
Ohuchi et al.

(10) Patent No.: US 6,218,954 B1
(45) Date of Patent: Apr. 17, 2001

(54) COMMUNICATION CONTROL DEVICE

(75) Inventors: Katsuhiro Ohuchi; Morio Sato, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/094,153

(22) Filed: Jun. 9, 1998

(30) Foreign Application Priority Data

Jun. 10, 1997 (JP) .................................. 9-152008

(51) Int. Cl.$^7$ .................................. G05B 23/02
(52) U.S. Cl. .................. 340/825.06; 123/425; 375/371; 701/102
(58) Field of Search .............. 340/825.06, 825.14, 340/825.12; 123/416, 421, 424, 371, 425; 701/36, 102; 375/371

(56) References Cited

U.S. PATENT DOCUMENTS

| 4,413,338 | 11/1983 | Renoulin, et al. |
| 5,371,859 | 12/1994 | Lennartsson . |
| 5,621,774 | * 4/1997 | Ishibashi et al. ................ 375/371 |
| 5,673,192 | * 9/1997 | Sato ................................ 701/36 |

FOREIGN PATENT DOCUMENTS

| 1081544 | 9/1987 | (JP) . |
| 6-276570 | 9/1994 | (JP) . |
| 7-22431 | 3/1995 | (JP) . |

OTHER PUBLICATIONS

European search report, dated Sep. 1, 2000.

\* cited by examiner

*Primary Examiner*—Michael Horabik
*Assistant Examiner*—W Bangachon
(74) *Attorney, Agent, or Firm*—Merchant & Gould P.C.

(57) ABSTRACT

A communication control device comprises a state change detecting section for outputting, upon detection of a state change in parallel input control signals, a transmission control instruction to a transmitting section. A standby time is provided between the time of detection of the control signal state change and the time of commencement of transmission of the serial signals by the transmitting section. For control signals to operate a controlled object at a desired time, the state change detecting section outputs the transmission control instruction a communication time plus the standby time earlier than the desired time.

7 Claims, 8 Drawing Sheets

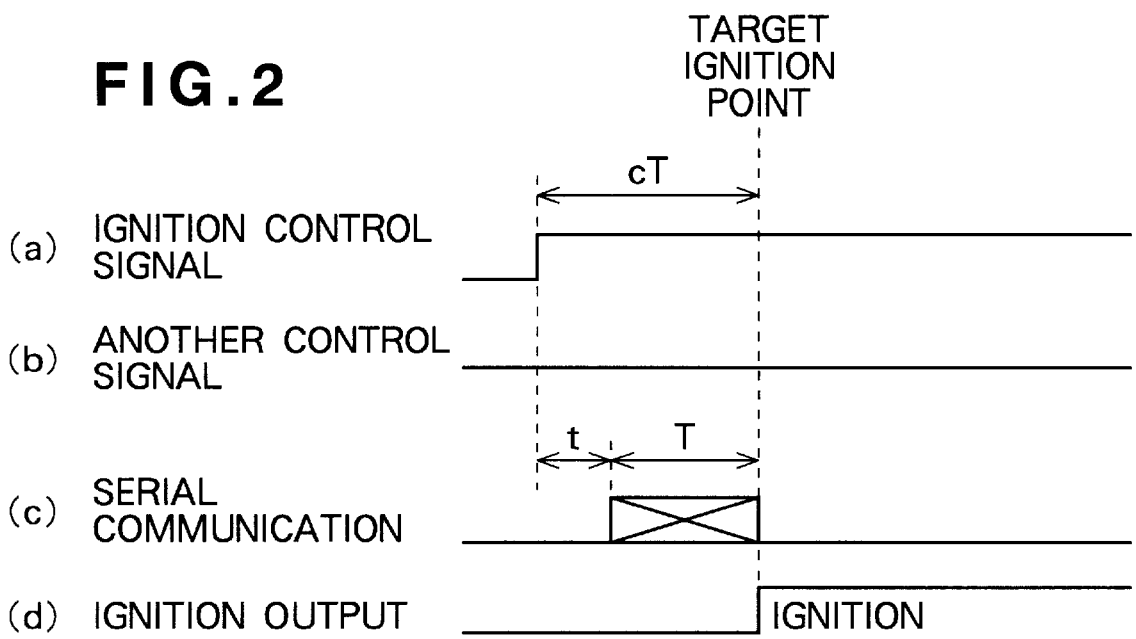
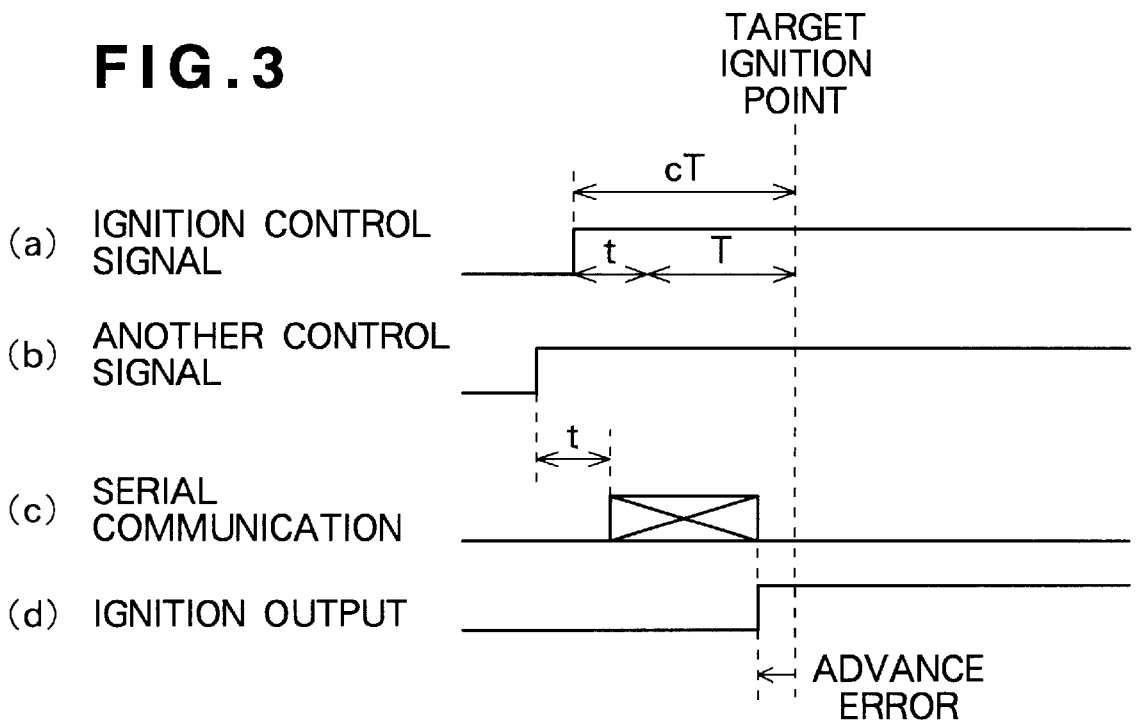

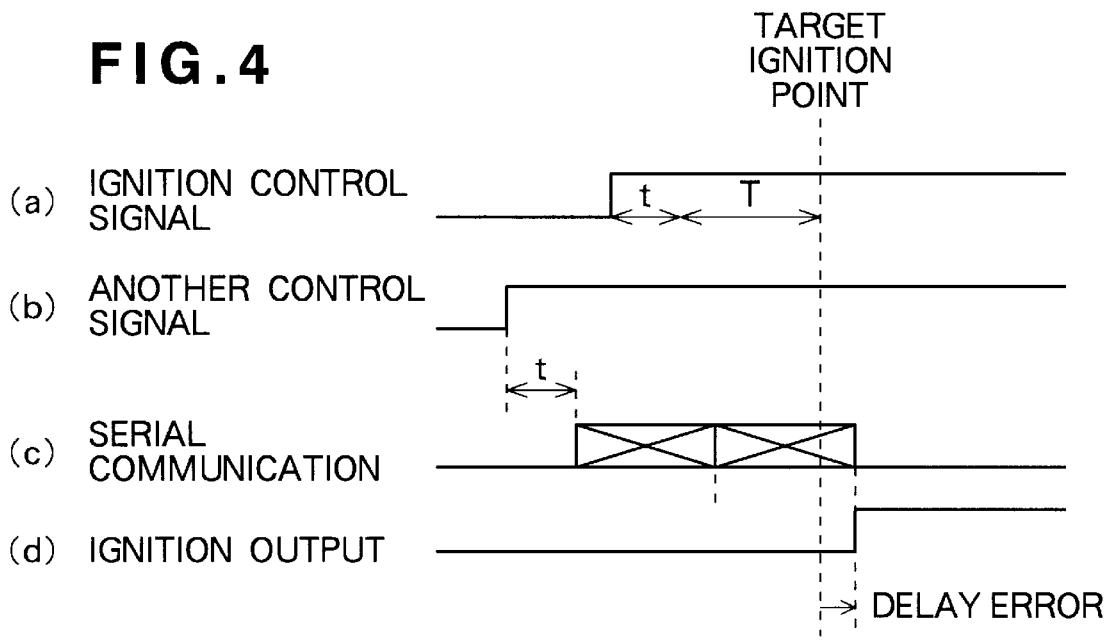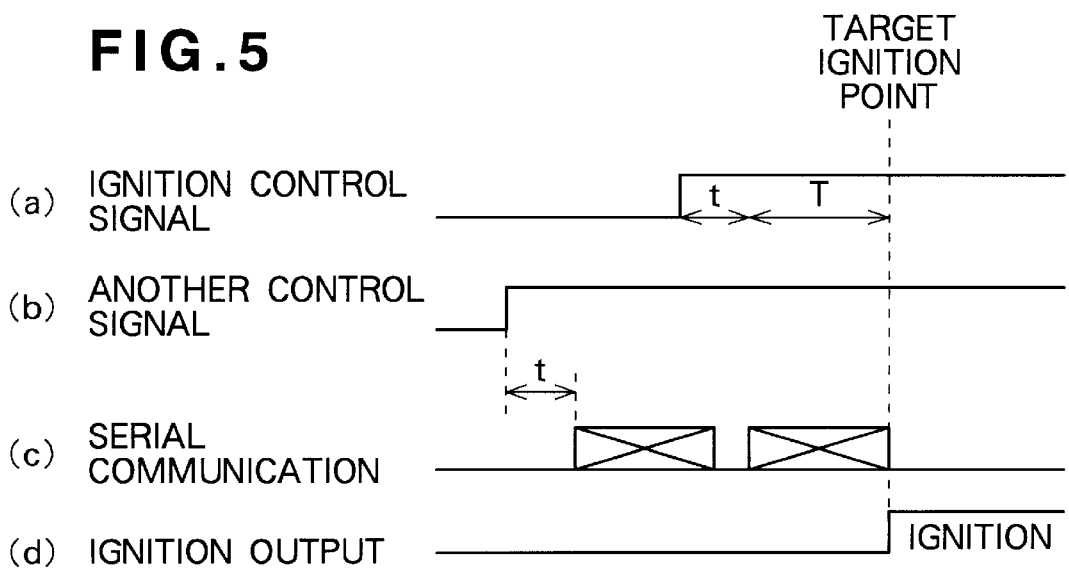

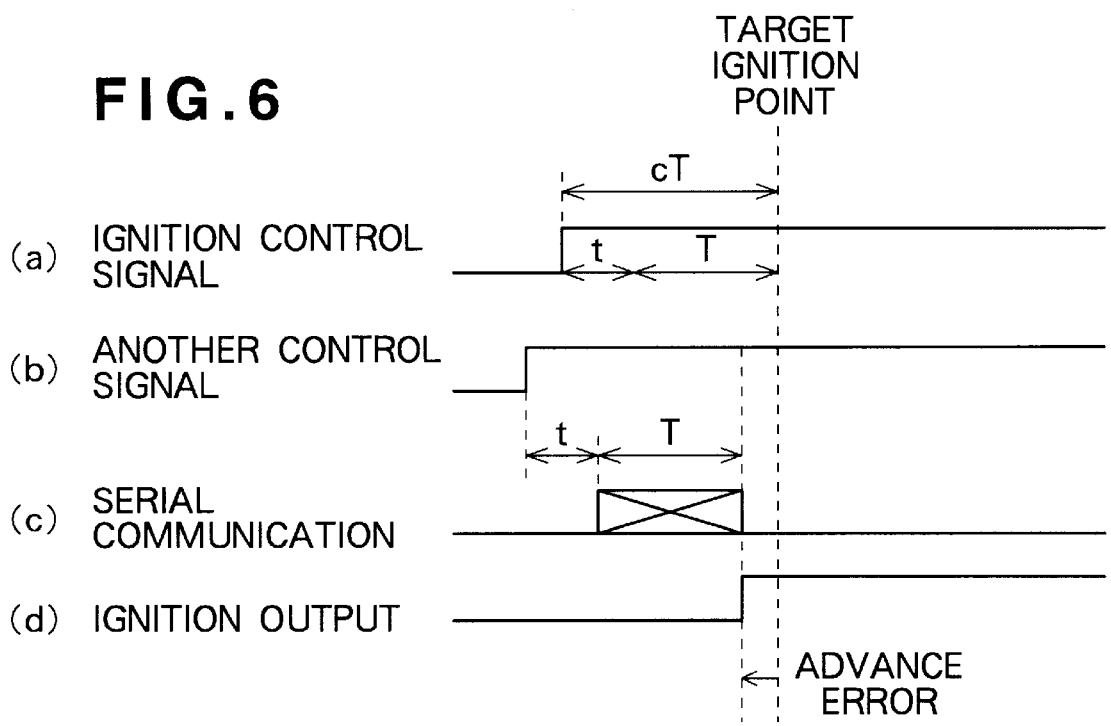
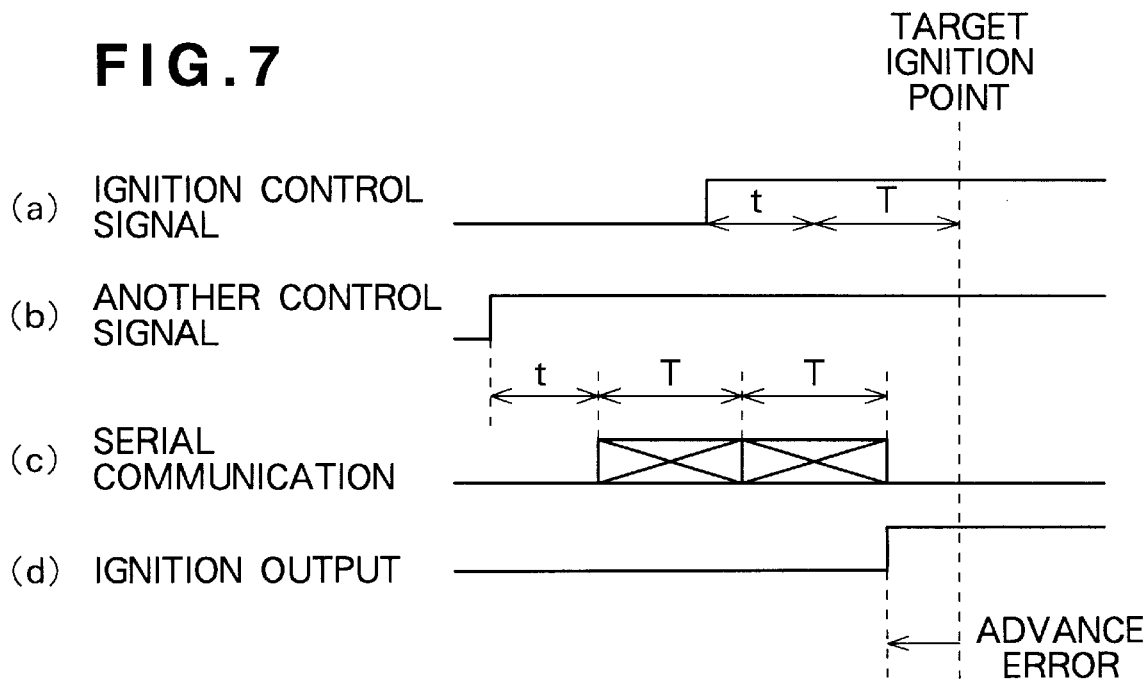

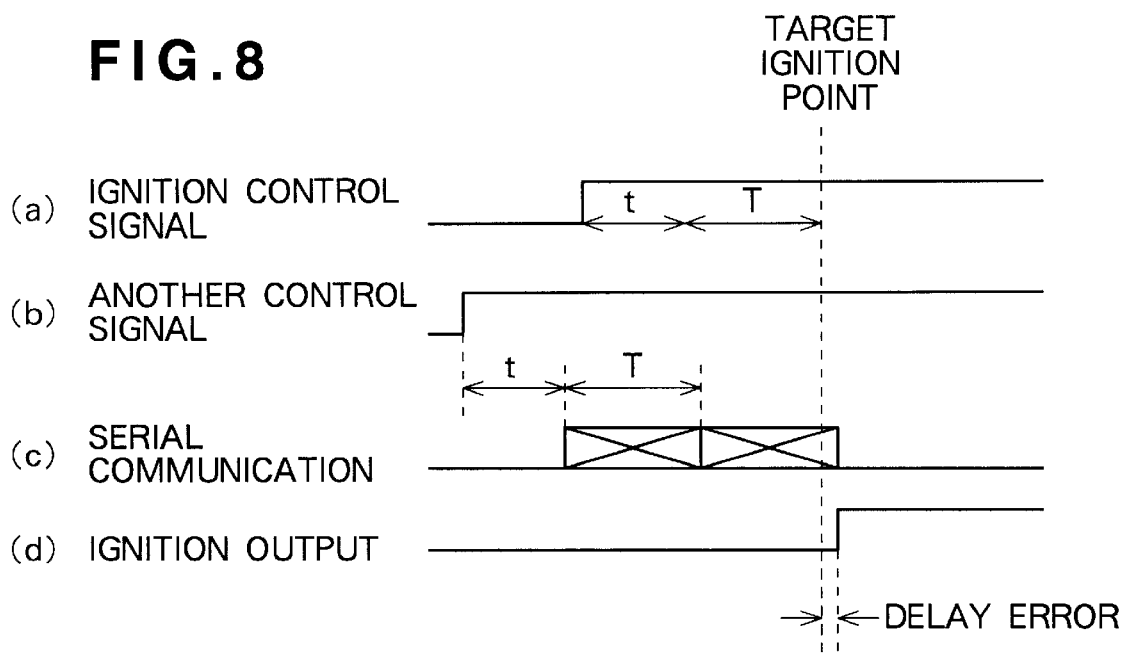

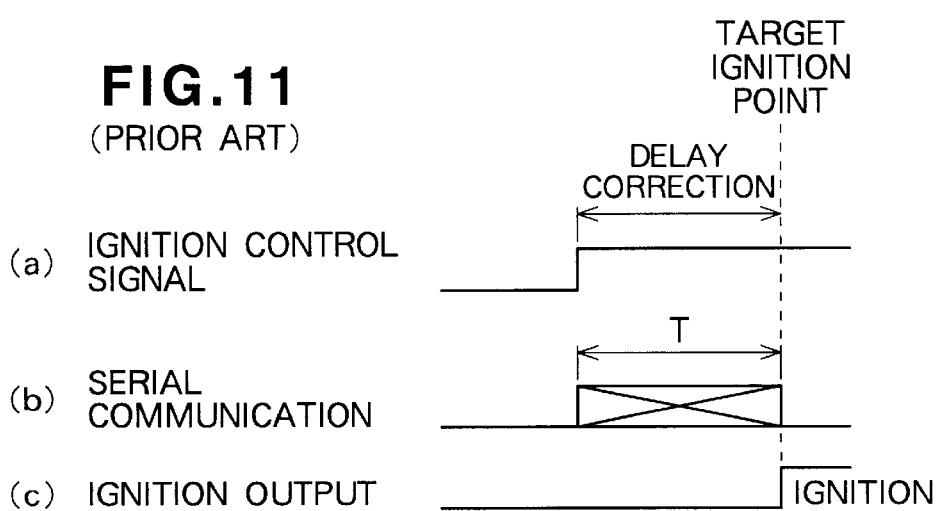
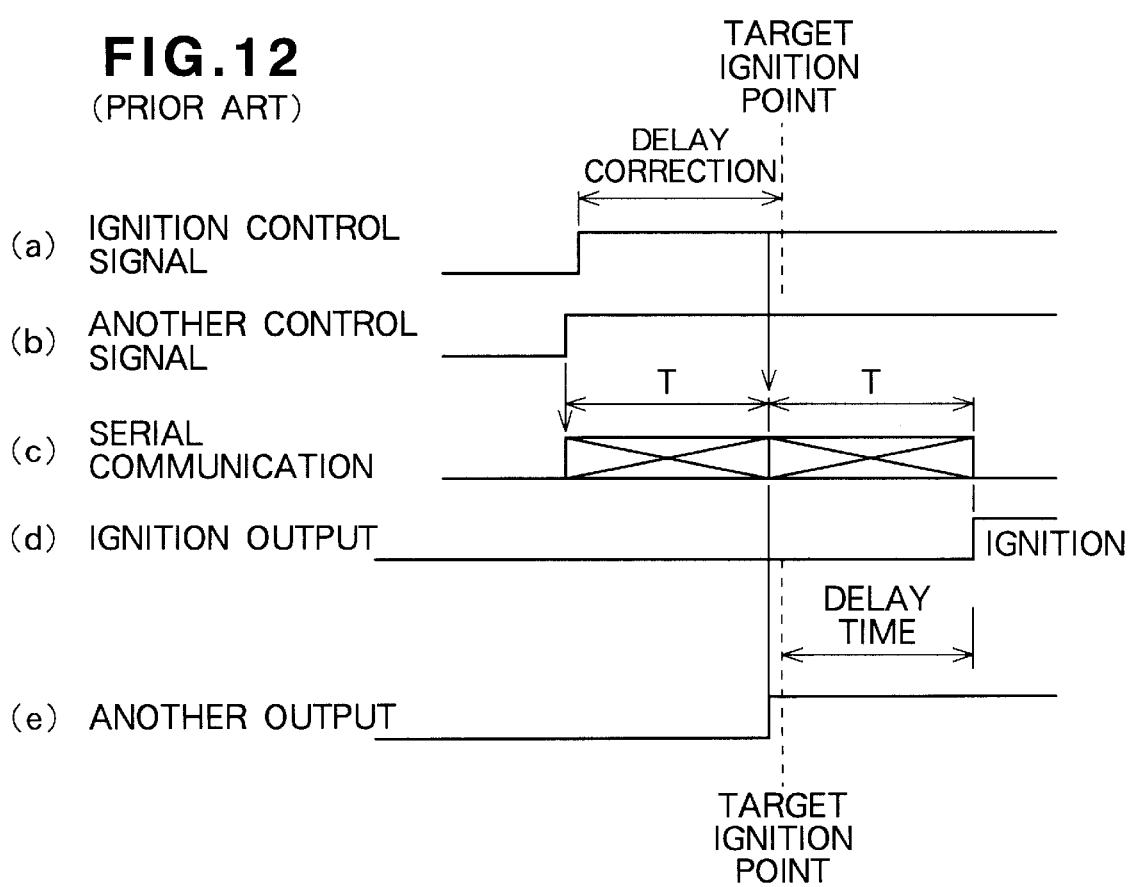

COMMUNICATION CONTROL DEVICE

BACKGROUND OF THE INVENTION

1. Field of the Invention

This invention relates to a communication control device having a transmitting section for serially transmitting two or more input signals, e.g., parallel input control signals, to a controlled section.

2. Description of the Related Art

Various communication control devices are known which allow for communication between units over a communication line. The known communication control devices have more or less the functions as illustrated in block diagram in FIG. 10 hereof.

The illustrated communication control device 100 comprises a controlling section 110, a transmitting section 120, a serial transmission line 130, a receiving section 140, and a controlled section 150.

Based on various inputs, the controlling section 110 supplies a plurality of control signals to a plurality of output ports (0 to N) for controlling the action of the controlled section 150. The control signals supplied to the output ports contain information for controlling a plurality of controlled objects not shown but provided in the controlled section 150.

More specifically, the controlling section 110 outputs, for example, to a first output port a signal instructing a first one of the controlled objects to perform an ON/OFF operation, to a second output port a signal instructing a second one of the controlled objects to perform an ON/OFF operation, to third and fourth output ports signals instructing a third one of the controlled objects to hold four different kinds of operational conditions, and to other output ports values for controlling other controlled objects.

The transmitting section 120 constantly monitors the state of the control signals output from the output ports of the controlling section 110. When a change whatsoever arises in an output state of any one of the output ports, the transmitting section 120 latches the outputs from all of the output ports, parallel-serial converts the latched outputs (into serial bit signals) and supplies the converted signals to the serial transmission line 130 at a preset data transmission speed.

When a change arises in an output state of any output port during an idle state (communication standby state) in which the transmitting section 120 is sending out no serial signals, the transmitting section 120 immediately latches the state of the output port and sends out serial signals.

When a change arises in an output state of any output port while the transmitting section 120 is sending out serial signals, the transmitting section 120 latches the state of the output port and sends out serial signals after transmission of the serial signals being sent out is finished.

The receiving section 140 receives the serially transmitted states of all of the output ports and transmits control signals, resulted from serial-parallel conversion of the received states, to the controlled section 150 in parallel. The states of the output ports of the controlling section 110 are transferred to the controlled section 150 in this manner.

Based on the control signals supplied from the receiving section 140, the controlled section 150 controls the operation of the controlled objects therein.

In the communication control device 100 of FIG. 10, the state of the output ports of the controlling section 110 can be transmitted to the controlled section 150 over a single transmission line connected therebetween.

However, in the above arrangement in which the state of the output ports of the controlling section 110 is transmitted through serial communication to the controlled section 150, there arises a delay corresponding to the time T required for at least the serial communication beginning at the time when a control signal is newly output from the controlling section 110 and ending at the time when the new signal is transmitted to the controlled section 150.

Assume, for example, that the controlling section 110 comprises an electronic control unit (ECU) for the ignition spark control and fuel injection, and that the controlled section 150 comprises an electronic ignition system and a fuel injector. Although the controlling section 110 outputs an ignition control signal in such a manner as to achieve the target ignition timing, the actual ignition occurring at the controlled section 150 is retarded by at least the time T required for the serial communication of the ignition control signal between the controlling section 110 and the controlled section 150.

Thus, the conventional communication control device 100 is arranged so that it outputs control signals intolerable of a delay of the time required for the serial communication, earlier than the target ignition timing (point) set at the controlling section 110 by the time required for the serial communication of the control signals.

Reference is now made to FIG. 11 which illustrates the operation of the conventional communication control device.

Based on input signals from, e.g., a crankshaft position sensor (not shown), the controlling section 110 calculates a rotational speed and angle of a crankshaft as well as a target ignition timing. As shown in (a) of FIG. 11, the controlling section 110 outputs to a predetermined output port an ignition control signal earlier by the time T required for the serial communication than the target ignition point (delay correction).

When it detects a change from a low level to a high level of an ignition control signal as shown in (a) of FIG. 11, the transmitting section 120 latches the output states of all of the output ports and serially transmits the latched state of each output port. Since the data length and data transmission rate is preset, the communication time T shown in (b) of FIG. 11 is constant.

The receiving section 140 receives a series of data sent out from the transmitting section 120, serial-parallel converts the serial signals and outputs the converted signals.

Consequently, after a lapse of the communication time T from the time of output of an ignition control signal by the controlling section 110, an ignition output corresponding to the ignition control signal is supplied from the receiving section 140 to the controlled section 150, as shown in (c) of FIG. 11, thereby effecting the ignition spark at the target ignition point.

Reference is next made to FIG. 12 which is a time chart for explaining the problems of the conventional communication control device.

With the time T required for the serial communication taken into consideration, the controlling section 110 outputs an ignition control signal the time T earlier than the target ignition point (timing). When, prior to the time of output of an ignition control signal as shown in (a) of FIG. 12, a separate or another control signal is output as shown in (b) of FIG. 12 (when there arises a change in the state of an output port), the transmitting section 120 detects a change in the state of the separate control signal and commences serial communication.

Thus, although a control instruction for initiating the feeding of an ignition control signal is output during the serial communication based on a change in the separate control signal, transmission of the state of a new output port including the ignition control signal may not be started until after the previous serial communication is finished (see (c) of FIG. 12).

Consequently, the actual ignition at the controlled section 150 with an ignition output supplied thereto will be delayed with respect to the target ignition point (timing). The maximum value of the time of delay from the target ignition point is equal to the communication time T required for the serial communication.

As is apparent from the foregoing discussion, in the conventional communication control device 100, there will be a delay of at most the communication time T before the state of a new output port of the controlling section 110 is transmitted to the controlled section 150. In other words, the time lag from the output of a control signal by the controlling section 110 to the arrival of the same signal at the controlled section 150 is 0 to the communication time T.

Thus, in engine ignition timing, for example, there will be a time lag of at most the communication time T between a target operation time and an actual operation time.

SUMMARY OF THE INVENTION

It is therefore an object of the present invention to provide a communication control device in which a control signal can be transmitted by from a controlling section through a transmitting section to a controlled section by serial communication with a minimized time delay between the target operation time (point) and the actual operation time (point).

According to one aspect of the present invention, there is provided a communication control device which comprises a state change detecting section for monitoring a state change in parallel input control signals and outputting a transmission control instruction upon detection of the state change in any one of the control signals, a transmitting section for transmitting, in accordance with the transmission control instruction from the state change detecting section, the control signals at the time of receipt of the instruction to a serial transmission line serially, and a controlled section for receiving the serial signals from the serial transmission line to thereby operate a controlled object therein, wherein a standby time is provided between the time of detection of the state change in the control signals and the time of commencement of transmission of the serial signals by the transmitting section, and wherein the sate change detecting section outputs, in relation to the control signals having a desired time to actuate the controlled object, the transmission control instruction a communication time (T) plus the standby time (t) earlier than the desired time.

With this arrangement, it becomes possible to transmit the control signals to the controlled section within a range of time displacement of ±½ times the communication time with respect to the desired operation point in time. By thus limiting the timing error to be within that ± order, the timing error can be decreased to about a half of the conventional one. Moreover, it becomes possible to increase the line use rate even when communication requests arise randomly.

The standby time may be provided in the state change detecting section or the transmitting section. In this instance, in accordance with a control signal state change, the state change detecting section may be arranged to wait for the standby time to lapse for outputting the transmission control instruction, thereby enabling the transmitting section to immediately commence the transmission of the serial signals. Alternatively, the transmitting section may be arranged to wait for the standby time to lapse for outputting the serials signals, thereby enabling the state change detecting section to output the transmission control instruction in accordance with a control signal state change.

Where, at the time of lapsing of the standby time from the time of detection of the state change in any one of the control signals, a transmission operation in accordance with the control signal state change occurred earlier than the time of lapsing in continuing, a transmission operation in accordance with the state change in the any one control signal is caused to start upon completion of the continuing transmission operation.

Where, at the time of detection of the state change in any one of the control signals, a transmission operation in accordance with the control signal state change occurred earlier than the time of detection is continuing, a transmission operation in accordance with the state change in the any one control signal is caused to start upon completion of the continuing transmission operation.

Preferably, the standby time is substantially equal to a half of the communication time.

In one desired form, the standby time is longer than a half of the communication time and shorter than the communication time.

In one preferred form, the serial transmission line allows for bidirectional communication between the transmitting section and the controlled section while the controlled section is allowed to communicate with the transmitting section over the bidirectional transmission line within the standby time.

According to another aspect of the present invention, there is provided a communication control device which comprises a state change detecting section for monitoring a state change in parallel input control signals and outputting a transmission control instruction upon detection of the state change in any one of the control signals, a transmitting section for transmitting, in accordance with the transmission control instruction from the state change detecting section, the control signals at the time or receipt of the instruction to a serial transmission line serially, and a controlled section for receiving the serial signals from the serial transmission line to thereby operate a controlled object therein, wherein when a state change is detected in one of the control signals having a desired time to actuate a controlled object, a deterrent time is provided for suppressing a transmission operation in accordance with a state change in another control signal occurred earlier than the desired time, and wherein the deterrent time is longer than a communication time (T) and shorter than two times the communication time.

The deterrent time may be provided in the state change detecting section or the transmitting section.

BRIEF DESCRIPTION OF THE DRAWINGS

Certain preferred embodiments of the present invention will hereinafter be described in detail, by way of example only, with reference to the accompanying drawings, in which:

FIG. 2 is a schematic time chart illustrating the operation of the communication control device;

FIG. 3 is a schematic time chart illustrating the operation of the communication control device;

FIG. 4 is a schematic time chart illustrating the operation of the communication control device;

FIG. 5 is a schematic time chart illustrating the operation of the communication control device;

FIG. 6 is a schematic time chart illustrating the operation of the communication control device;

FIG. 7 is a schematic time chart illustrating the operation of the communication control device;

FIG. 8 is a schematic time chart illustrating the operation of the communication control device;

FIG. 11 is a schematic time chart illustrating the operation of the conventional communication control device; and FIG. 12 is a schematic time chart illustrating the operation of the conventional communication control device.

DETAILED DESCRIPTION OF THE PREFERRED EMBODIMENTS

The following description is merely exemplary in nature and is in no way intended to limit the invention or its application or uses.

Figure 1:
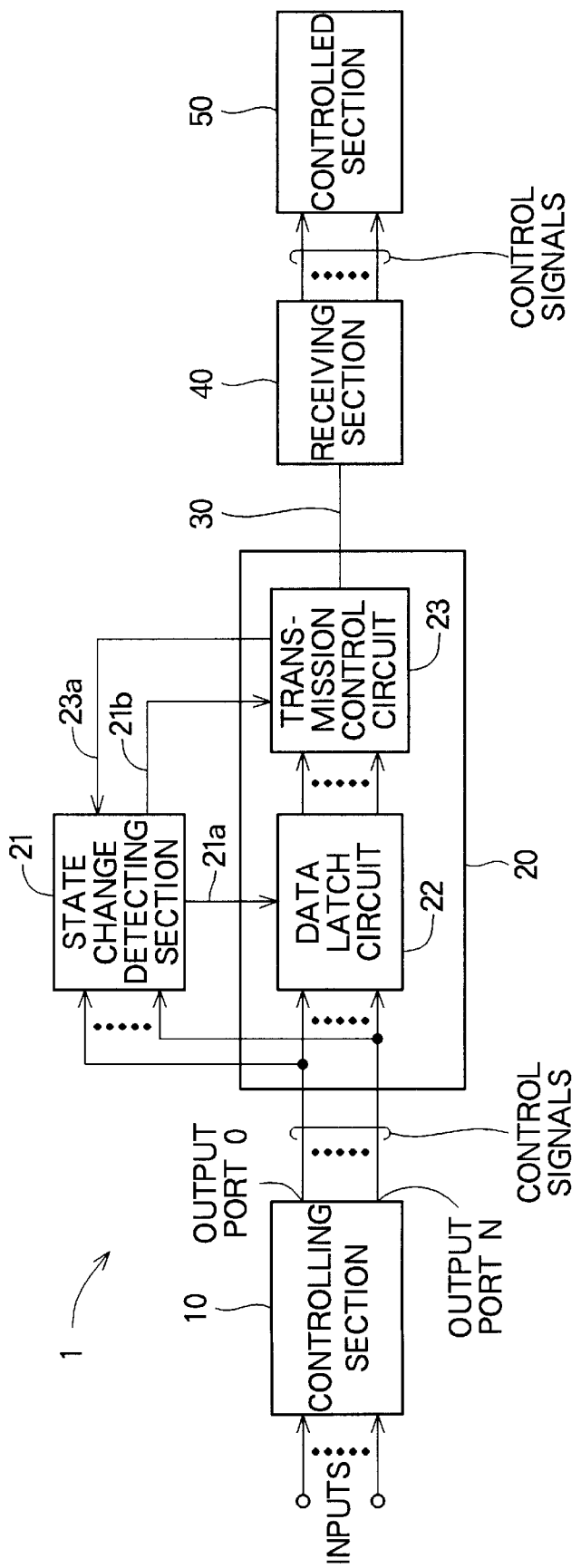
FIG. 1 is a block diagram illustrating the general arrangement of a communication control device according to the present invention.

Referring to FIG. 1, a communication control device 1 in accordance with the present invention comprises a controlling section 10, a transmitting section 20, a state change detecting section 21, a serial transmission line 30, a receiving section 40 and a controlled section 50.

Based on various input signals, the controlling section 10 outputs to output ports (0–N) control signals for controlling the operation of the controlled section 50. The control signals fed to the output ports comprise control information for controlled objects not shown but provided in the controlled section 50. For example, the controlling section 10 outputs to a first output port a signal instructing a first controlled object to perform an ON/OFF operation, to a second output port a signal instructing a second controlled object to perform an ON/OFF operation, to third and fourth output ports signals instructing a third controlled object to hold four different kinds of operational conditions, and to other output ports values for controlling other controlled objects.

The state change detecting section 21 monitors the state of at least one of parallel input control signals and outputs a transmission control instruction 21b to the transmitting section 20 when it detects a change in the state of any one of the control signals. A standby time "t" running from the time of detection of the state change of the control signal to the time at which the transmitting section 20 commences transmission of a serial signal is set by the state change detecting section 21 or the transmitting section 20. Upon outputting a control signal for actuating a controlled object at a desired time, the controlling section 10 outputs the control signal the communication time T plus the standby time t (T+t) earlier than the desired time.

Upon detection of a change in the output state of an output port while an idle/busy signal 23a from a transmission control circuit 23 indicates an idle state, the state change detecting section 21 first outputs a latch signal 21a after lapsing of the standby time t from the time of detection of an initial change and then a transmission control instruction 21b. Upon detection of a change in the state of an output port while the idle/busy signal 23a indicates a busy state (being in serial communication), the state change detecting section 21 outputs the latch signal 21a upon turning of the idle/busy signal 23a to an idle state (i.e., upon termination of the communication) and then the transmission control instruction 21b.

As shown in FIG. 1, the transmission section 20 has a data latch circuit 22 and the transmission control circuit 23. When fed with a latch signal 21a from the state change detecting section 21, the data latch circuit 22 latches the control signals then output to the output ports 0–N of the controlling section 10. The latched control signals are fed to the transmission control circuit 23.

When fed with a transmission control instruction 21b from the state change detecting section 21, the transmission control circuit 23 converts the control signals latched by the data latch circuit 22 into serial bit signals, adds to the head and tail of the serial bit signals information such as a start bit and a stop bit for providing character synchronization, and transmits the resulted signals to the serial transmission line 30. In an idle state wherein no serial communication is carried out, the transmission control circuit 23 outputs an idle/busy signal 23a indicating an idle state while it outputs an idle/busy signal 23a indicating a busy state wherein serial communication is being carried out. The serial transmission line 30 is comprised of a single communication line.

The receiving section 40 receives the serially transmitted signals and parallel outputs to the controlled section 50 the control signals obtained by serial-parallel conversion of the received signals. The state of an output port of the controlling section 10 is thus transmitted to the controlled section 50. Based on the control signals supplied from the receiving section 40, the controlled section 50 controls the operation of the controlled objects therein.

Reference is now made to the time charts of FIGS. 2 to 4 which illustrate the operations of the described communication control device. Herein, an ignition control signal is exemplified as a control signal for the control of a controlled object in which a delay of operation is undesirable. FIG. 2 shows a case wherein no completion occurs between the ignition control signal and another control signal.

As shown in (a) of FIG. 2, the controlling section 10 outputs an ignition control signal the communication time T plus the standby time t (T+t or cT) earlier than the target ignition point (timing). For example, the ignition control signal is output one and a half times (1.5T) earlier than the target ignition point (timing).

At the time of output of the ignition control signal, the transmitting section 20 is in an idle state. Where no transmission control instructions are output to the transmitting section 20 in a time period from the time of output of the ignition control signal to a time point earlier by the standby time t, the transmitting section 20 latches the state of the output ports and commences the relevant serial transmission upon lapsing of the standby time t from the time of output of the ignition control signal.

As shown in (c) of FIG. 2, upon lapsing of the communication time T required for the serial transmission, the ignition output is supplied from the receiving section 40 to the controlled section 50. The ignition output is thus output to achieve the target ignition timing (point) to thereby cause the ignition to place at the target ignition point. Thus, where no competition occurs between the ignition control signal and another control signal, no time deviation arises between the target ignition point and the actual ignition point.

Reference is next made to FIG. 3 which shows a case wherein the ignition control signal is output before the standby time t elapses from the time of occurrence of a change in the state of another control signal.

As shown in (b) and (a) of FIG. 3, when the ignition control signal is output in a time period from the time of output by the controlling section 10 of a new state of another control signal to the time of lapsing of the standby time t, the transmitting section 20 latches all the control signals, including the ignition control signal, upon lapsing of the standby time t from the time of detection of the state change of another control signal shown in (b) of FIG. 3 and serially transmits the latched control signals.

Since the controlling section 10 outputs the ignition control signal, e.g., one and a half (1.5T) times the communication time T earlier than the target ignition point (timing), the ignition output is output at a time point earlier than the target ignition point, as shown in (d) of FIG. 3. Consequently, there occurs an advance error in which the actual ignition point comes before the target ignition point. Where the ignition control signal is output immediately before the time when each control signal is latched based on the state change of another control signal, the advance error relative to the target ignition point (timing) becomes maximum. The value of the maximum error is ½ of the communication time T.

Reference is next made to FIG. 4 which shows a case wherein the ignition control signal is output during the serial communication based on the state change of another control signal.

Upon lapsing of the standby time t from the time of output of another control signal shown in (b) of FIG. 4, the transmitting section 20 latches each signal at the time of lapsing of the standby time t and starts the relevant serial transmission, as shown in (c) of FIG. 4. Where the ignition control signal is output during such transmission as shown in (a) of FIG. 4, the transmitting section 20 latches each control signal and starts the relevant serial transmission after the previous transmission is finished. As a result, the point at which the actual spark is effected by the ignition control signal transmitted to the controlled section 50 comes after the target ignition point (ignition delay). Such a delay error becomes maximum when the ignition control is output immediately after each control signal is latched based on the state change of another control signal. The maximum value of the delay error is equal to the standby time t and may be, for example, ½ of the communication time T.

As to controls (e.g., ignition timing) in which a delay in controlled operation is undesired, the communication control device 1 shown in FIG. 1 is arranged to output such control signals the communication time T plus the standby time t (T+t) earlier than desired operation timing and to serial transmit the control signals at the time of lapsing of the standby time t from the time of output of the control signals. Thus, as shown in FIGS. 1 to 4, the transmission of the control signals to the controlled section is timed to be within a range of the standby time t relative to the desired operation point (timing). For example, it may be within a range of ±½ times the communication time T.

FIG. 5 shows a case wherein the ignition control signal is output during the serial transmission conducted on the basis of the state change in another control signal. This arrangement may be incorporated into the communication control device.

Upon lapsing of the standby time t from the time of change in the state of another control signal shown in (b) of FIG. 5, the transmitting section 20 latches each control signal at the time of lapsing of the standby time t and commences the serial transmission of the control signal, as shown in (c) of FIG. 5. When the ignition control signal is output during such transmission as shown in (a) of FIG. 5, since the time of lapsing of the standby time t from the time of output of the ignition control signal is later than the time of completion of the previous communication, the transmitting section 20 latches and commences the serial transmission of each control signal at the later time. Consequently, the timing in which the ignition control signal is transmitted to the controlled section 50 to initiate the actual ignition operation coincides with the target ignition timing.

Shown in FIGS. 6 to 8 are cases wherein the standby time t is T/2<t<T.

FIG. 6 shows a case wherein the ignition control signal is output in a time period from the time of the state change in another control signal to the time of lapsing of the standby time t. As shown in (b) and (a) of FIG. 6, when the ignition control signal is output in a time period from the time of output by the controlling section 10 of a new state of another control signal to the time of lapsing of the standby time t, the transmitting section 20 latches all the control signals, including the ignition control signal, upon lapsing of the standby time t from the time of detection of the state change of another control signal shown in (b) of FIG. 6 and serial transmits the latched control signals.

Since the controlling section 10 outputs the ignition control signal the communication time T plus the standby time t earlier than the target ignition point, the ignition output is output at a time earlier than the target ignition timing, as shown in (d) of FIG. 6. This produces an advance error wherein the actual ignition spark is made to occur the standby time t earlier than the target ignition point (timing).

When the ignition control signal is output immediately before the time of latching of each control signal on the basis of the state change of another control signal, the advance error relative to the ignition point becomes maximum. The maximum value of the advance error becomes substantially equal to the communication time T when the value of t is made to be equivalent to the value of T.

Reference is made to FIG. 7 which illustrates a case wherein the ignition control signal is output during the serial transmission conducted on the basis of the state change of another control signal. The illustrated arrangement may be incorporated into the above-described communication control device.

Upon lapsing of the standby time t from the time of occurrence of the state change of another control signal shown in (b) of FIG. 7, the transmitting section 20 latches each control signal as of the time of lapsing of the standby time t and commences the serial transmission thereof, as shown in (c) of FIG. 7. When the ignition control signal is output during such transmission as shown in (a) of FIG. 7, the transmitting section 20 latches each control signal upon completion of the previous communication and commences the serial transmission thereof. Thus, the time in which the actual ignition operation is effected in the controlled section 50 by the ignition control signal transmitted thereto occurs the standby time t earlier than the target ignition point, thereby producing an advance error. This advance error becomes maximum when the ignition control signal is output immediately before the completion of the serial transmission of another control signal. The maximum value of the advance error becomes substantially equal to the communication time t when the value of t is made to be generally equivalent to the value of T.

FIG. 8 shows a case wherein the ignition control signal is output during the serial communication conducted on the basis of the state change of another control signal. The illustrated arrangement may be incorporated into the above-described communication control device.

Upon lapsing of the standby time t from the time of occurrence of the state change of another control signal shown in (b) of FIG. 8, the transmitting section 20 latches each control signal as of the time of lapsing of the standby time t and commences the serial transmission thereof, as shown in (c) of FIG. 8. When the ignition control signal is output during such transmission as shown in (a) of FIG. 8, the transmitting section 20 latches each control signal upon completion of the previous communication and commences the serial transmission thereof. Consequently, the time in which the actual ignition operation is effected in the controlled section 50 by the ignition control signal transmitted thereto occurs |T−t| later than the target ignition point, thereby producing a delay error. This delay error becomes maximum when the ignition control signal is output immediately after the start of the serial transmission of another control signal. The maximum value of the delay error becomes generally T/2 when the value of t is made to be substantially t/2.

By thus making the range of the standby time t to be T/2<t<T, the delay error can be decreased while the advance error can be increased with the increase of the standby time t. This arrangement is effective in a case wherein the occurrence of the delay error is undesirable but the occurrence of the advance error is permitted.

When the state change detecting section 21 detects a state change of a control signal and there is a desired operation time of a controlled object corresponding to the control signal, a suppression time for suppressing transmission in accordance with the state change of another control signal may be provided before the desired operation time. The suppression time may have a value larger than the communication time T and smaller than two times the communication time T. This arrangement makes it possible to make the controlled object operate at the desired operation time.

The controlling section 10 may be formed by using a one-chip microcomputer of a microcomputer system. In this case, control information may be supplied through a data bus to the transmitting section 20 and the state change detecting section 21 without providing any dedicated ports for outputting plural control signals.

The transmitting section 20 and the state change detecting section 21 may be formed by using a general-purpose serial transmission LSI. Further, the controlling section 10, the transmitting section 20 and the state change detecting section 21 may be integrated by using a one-chip microcomputer including a serial transmission circuit such that the transmission of control signals can be program (software) controlled.

Figure 9:
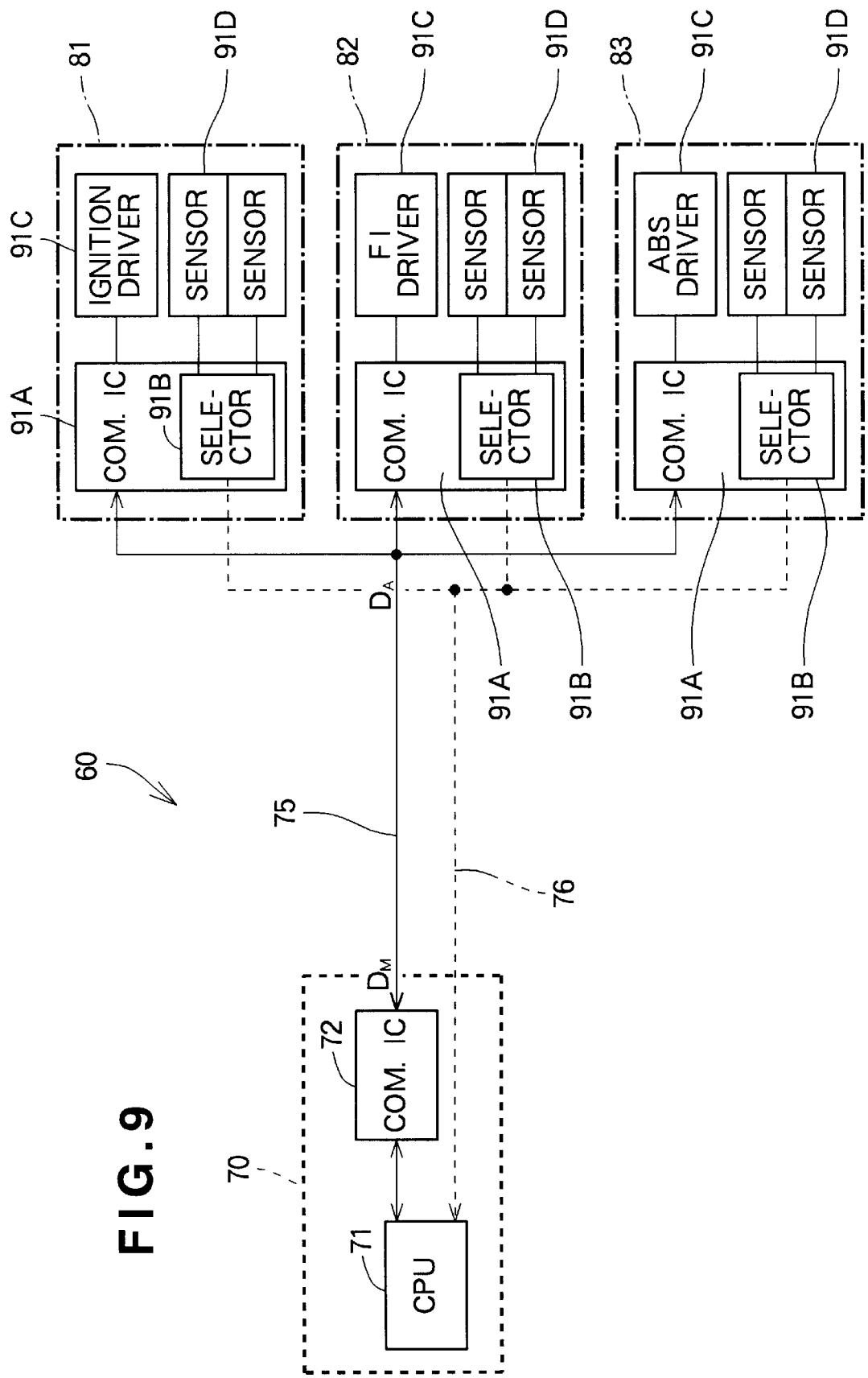
FIG. 9 is a block diagram illustrating the general arrangement of a separate communication control device employing the basic principle of the present invention.
Figure 10:
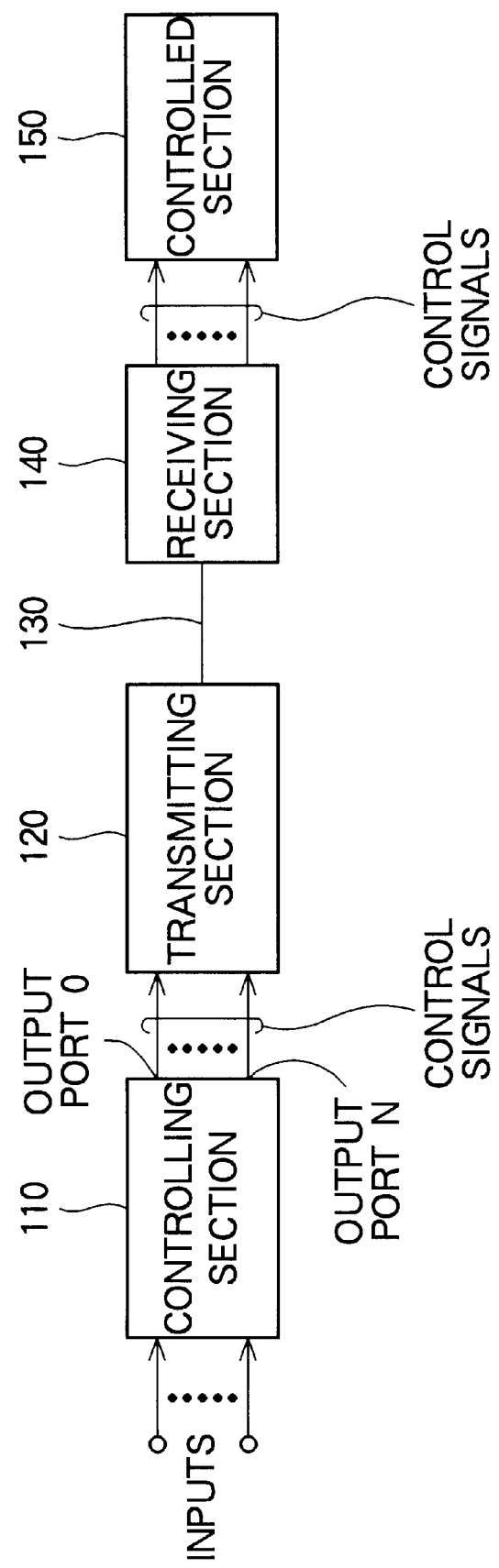
FIG. 10 is a block diagram illustrating the general arrangement of a conventional communication control device.

FIG. 9 schematically illustrates in block diagram the general arrangement of a separate communication control device to which the basic principle of the present invention is applied.

As shown in FIG. 9, the communication control device 60 comprises a main control system 70, subsystems 81, 82, 83 and a bidirectional serial transmission line 75 connecting the main control system 70 and the subsystems 81, 82, 83. The two-way transmission, namely, the transmission of a control signal DM from the main control system 70 to the subsystems 81, 82, 83 and the transmission of verification signals from the subsystems 81, 82, 83 to the main system 70 are effected over the bidirectional serial transmission line 75.

The main control system 70 comprises a CPU 71 and a communication IC 72. The CPU 71 carries out calculations and processing required for the control of the subsystems 81, 82, 83. For example, the CPU 71 generates a control signal for driving an ignition driver 91 of the subsystem 81, converts in the communication IC 72 the control signal into a control signal DM according to the relevant communication protocol, and than transmits the converted control signal DM to the bidirectional serial transmission line 75.

The CPU 71 is connected with the subsystems 81, 82, 83 through an analog bus 76 so that it can receive analog signals detected by sensors 91D of the subsystems 81, 82, 83, A–D (analog/digital) converts the received sensor signals, and carried out calculations and processing on the resulted digital sensor signals to thereby produce control signals.

Each subsystem 81, 82, 83 includes a communication IC with a selector 91B, plural drivers 91C (e.g., an ignition driver, an FI driver and an ABS driver), and plural sensors 91D.

Sensor signals detected by each sensor 91D are selected in sequence by the respective selectors and supplied to an A/D converter in the CPU 71 of the main control system 70 via the analog bus 76. The sequencing of the sensor signals of the subsystems 81, 82, 83 may be executed by transmitting from the CPU 71 of the main control system 70 to the subsystems 81, 82, 83 instruction codes as control signals DM and sequentially switching the selectors 91B.

Communication ICs 91A of the subsystems 81, 82, 83 receive the control signals DM from the main system 70 and control the drive of the various drivers 91C including the ignition driver, the FI driver and the ABS driver on the basis of the control signals (by, for example, digital/analog conversion thereof). The communication ICs 91A also transmit to the main system 70 over the bidirectional serial transmission line 75 confirmation signals DA confirming that the ignition driver, FI driver and ABS driver are actuated, as well as other communication signals.

In the above-described communication control device, the CPU 71 and the communication IC 72 correspond respectively to the controlling section 10 and the transmitting section 20 of FIG. 1. In the embodiment being described, a transmission line which allows for bidirectional communication is used as the serial transmission line with the result that collisions between the communications of the main control system 70 and the subsystems 81, 82, 83 may occur. For avoiding collisions between the control signals DM and confirmation signals DA upon simultaneous transmission thereof through the bidirectional serial transmission line 75, priority may be given to the signal transmissions (communications) to and from the main system 70 and subsystems 81, 82, 83.

For example, first priority may be given to the signal transmissions by the main system 70; second priority to the signal transmissions by the subsystem 81; third priority to the signal transmissions by the subsystem 82; and fourth priority to the signal transmissions by the subsystem 83. The communication ICs may be arranged so that they can identify the communication currently occupying the bidirectional serial transmission line 75 and its priority and that when it detects a priority not of its own, it discontinues the signal transmission of its own to the bidirectional serial transmission line 75.

Accordingly, when the main control system 70 and one of the subsystems 81, 82, 83 initiated their communications at the same time, since the main control system 70 is given the first priority, the communication of the main control system 70 is executed to thereby actuate the respective driver of the respective subsystem 81, 82, 83, while the communication of the one subsystem 81, 82, 83 is discontinued.

Where a request for signal transmission is made by the main controls system 70 during the transmission of the signal from one of the subsystems 81, 82, 83, it becomes necessary for the transmission of a signal from the main control system 70 to wait for the completion of the signal transmission of the one subsystem 81, 82, 83, in which instance the target timing may be undesirably displaced.

For preventing such timing displacement, the communication time of each subsystem 81, 82, 83 may be set to be the standby time (t=T/2: half the communication time of the main control system) upon commencement of the communication of the main system 70 while the communication time in which the signals DA of the subsystems 81, 82, 83 occupy the serial transmission line 75 may be set to be within the standby time t of the main system 70. As a result, the target timing displacement may not occur even where the main control system 70 likes to transmit the control signal DM while the signal DA of the one subsystem 81, 82, 83 is present in the bidirectional serial transmission line 75, because the communication of the one subsystem 81, 82, 83 is completed within the preceding standby time of the main control system 70.

As is apparent from the foregoing description, in the communication control device 60 employing the bidirectional serial transmission line, since the transmission time of each subsystem 81, 82, 83 is restricted to be within the standby time upon the commencement of the communication of the main system 60, it becomes possible to actuate the subsystems 81, 82, 83 at the target time point even when a communication request is made by the main control system 70 while one of the subsystems 81, 82, 83 is conducting its communication over the bidirectional serial transmission line 75.

Obviously, various minor changes and modifications of the present invention are possible in the light of the above teaching. It is therefore to be understood that within the scope of the appended claims, the present invention may be practiced otherwise than as specifically described.

What is claimed is:

1. A communication control device comprising:

a state change detecting section for monitoring a state change in parallel input control signals and outputting a transmission control instruction upon detection of the state change in any one of said control signals;

a transmitting section for transmitting, in accordance with said transmission control instruction from said state change detecting section, said control signals at the time of receipt of said instruction to a serial transmission line serially; and a controlled section for receiving said serial signals from said serial transmission line to thereby operate a controlled object therein, wherein a standby time is provided between the time of detection of the state change in said control signals and the time of commencement of transmission of said serial signals by said transmitting section, and wherein said state change detecting section outputs, in relation to said control signals having a desired time for actuation of said controlled object, said transmission control instruction a communication time plus the standby time earlier than the desired time.

2. A communication control device according to claim 1, wherein where, at the time of lapsing of the standby time from the time of detection of the state change in any one of said control signals, a transmission operation in accordance with the control signal state change occurred earlier than said time of lapsing is continuing, a transmission operation in accordance with the state change in said any one control signal is caused to start upon completion of said continuing transmission operation.

3. A communication control device according to claim 1, wherein where, at the time of detection of the state change in any one of said control signals, a transmission operation in accordance with the control signal state change occurred earlier than said time of detection is continuing, a transmission operation in accordance with the state change in said any one control signal is caused to start upon completion of said continuing transmission operation.

4. A communication control device according to claim 1, wherein said standby time is substantially equal to a half of said communication time.

5. A communication control device according to claim 1, wherein said standby time is longer than a half of said communication time and shorter than said communication time.

6. A communication control device according to claim 1, wherein said serial transmission line allows for bidirectional communication between said transmitting section and said controlled section, and wherein said controlled section is allowed to communicate with said transmitting section over said bidirectional transmission line within said standby time.

7. A communication control device comprising:

a state change detecting section for monitoring a state change in parallel input control signals and outputting a transmission control instruction upon detection of the state change in any one of said control signals;

a transmitting section for transmitting, in accordance with said transmission control instruction from said state change detecting section, said control signals at the time of receipt of said instruction to a serial transmission line serially; and a controlled section for receiving said serial signals from said serial transmission line to thereby operate a controlled object therein, wherein when a state change is detected in one of said control signals having a desired time to actuate a controlled object, a deterrent time is provided for suppressing a transmission operation in accordance with a state change in another control signal occurred earlier than the desired time, and wherein said deterrent time is longer than a communication time and shorter than two times the communication time.

* * * * *